United States Patent
San Martin et al.

(10) Patent No.: US 10,450,852 B2
(45) Date of Patent: Oct. 22, 2019

(54) FORMATION MONITORING THROUGH THE CASING

(71) Applicant: Halliburton Energy Services, Inc, Houston, TX (US)

(72) Inventors: Luis Emilio San Martin, Houston, TX (US); Ronald J. Dirksen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/518,401

(22) PCT Filed: Dec. 11, 2014

(86) PCT No.: PCT/US2014/069790
§ 371 (c)(1),
(2) Date: Apr. 11, 2017

(87) PCT Pub. No.: WO2016/093841
PCT Pub. Date: Jun. 16, 2016

(65) Prior Publication Data
US 2017/0306746 A1    Oct. 26, 2017

(51) Int. Cl.
*E21B 47/01* (2012.01)
*G01V 3/20* (2006.01)
*E21B 47/10* (2012.01)

(52) U.S. Cl.
CPC ............ *E21B 47/01* (2013.01); *E21B 47/102* (2013.01); *G01V 3/20* (2013.01); *Y02A 90/342* (2018.01)

(58) Field of Classification Search
None
See application file for complete search history.

(56) References Cited

U.S. PATENT DOCUMENTS

| 4,882,542 A | 11/1989 | Vail |
| 2002/0000316 A1* | 1/2002 | Haase ................... E21B 17/003 |
| | | 166/244.1 |

(Continued)

FOREIGN PATENT DOCUMENTS

WO    WO 2010/065208 A1    6/2010

OTHER PUBLICATIONS

International Search Report and The Written Opinion of the International Search Authority, or the Declaration, dated Aug. 19, 2015, PCT/US2014/069790, 16 pages, ISA/KR.

(Continued)

*Primary Examiner* — Muhammad N Edun
*Assistant Examiner* — Jerold B Murphy
(74) *Attorney, Agent, or Firm* — Haynes and Boone, LLP

(57) ABSTRACT

A formation monitoring well system accurately measures formation electrical properties behind the casing to determine water-oil contact positions and/or to assess the integrity of the cement seal over the life of the well. The well system includes a casing string having one or more formation monitoring modules embedded therein, each having a toroid sensor.

During operation, current is provided to the casing string, and the toroid measures the current flowing into the formation. Also, the voltage drop between the sensor and an electrode positioned between the cement layer and formation may be measured. This data may then be processed to determine the resistivities of the formation and/or cement layer, whereby the cement seal quality, water-oil contact surface position, etc. may be extracted from the results.

17 Claims, 7 Drawing Sheets

(56) References Cited

U.S. PATENT DOCUMENTS

| | | | |
|---|---|---|---|
| 2005/0242819 A1 | 11/2005 | Gold et al. | |
| 2009/0038793 A1* | 2/2009 | Schmitt | E21B 47/121 |
| | | | 166/250.01 |
| 2010/0018702 A1* | 1/2010 | Cook | E21B 47/06 |
| | | | 166/250.07 |
| 2010/0134112 A1 | 6/2010 | Zhang et al. | |
| 2013/0099808 A1* | 4/2013 | Li | G01N 27/07 |
| | | | 324/722 |
| 2013/0197810 A1* | 8/2013 | Haas | G01V 9/00 |
| | | | 702/12 |
| 2014/0174732 A1 | 6/2014 | Goodwin et al. | |
| 2014/0222343 A1* | 8/2014 | Samson | G01V 3/12 |
| | | | 702/8 |
| 2014/0367092 A1* | 12/2014 | Roberson | E21B 47/00 |
| | | | 166/250.01 |
| 2015/0167447 A1* | 6/2015 | Tjhang | E21B 47/0002 |
| | | | 348/85 |
| 2016/0256911 A1* | 9/2016 | Cooper, Jr. | B21D 28/145 |
| 2016/0356911 A1* | 12/2016 | Wilson | G01N 27/221 |
| 2017/0146680 A1* | 5/2017 | Boul | G01V 3/24 |

OTHER PUBLICATIONS

Prammer, et al. "Field Testing of an Advanced LWD Imaging Resistivity Tool," *48th Annual Logging Symposium*, Society of Petrophysicists and Well-Log Analysts, Jan. 1, 2007.

\* cited by examiner

F1: Function of the measurements.
F2: Function of the simulated measurements.

FORMATION MONITORING THROUGH THE CASING

PRIORITY

The present application is a U.S. National Stage patent application of International Patent Application No. PCT/US2014/069790, filed on Dec. 11, 2014, the benefit of which is claimed and the disclosure of which is incorporated herein by reference in its entirety.

FIELD OF THE DISCLOSURE

The present disclosure generally relates to the monitoring of formation properties and, more particularly, to a system and method for evaluating formation properties behind a casing string.

BACKGROUND

Knowledge of formation properties behind the casing can be beneficial for the optimization of production in oil and gas wells. Specifically, near production zones, information about the precise location of the water-oil contact surface is useful for optimal management of the resource with significant economic consequences. The integrity of the cement seal is also crucial to ensure zone isolation and avoid water production or contamination.

Conventional monitoring methods use resistivity measurements to determine formation characteristics behind the casing. Several tools for behind the casing resistivity have been proposed, without significant commercial success so far, due to a significant uncertainty of the results. For example, due to the highly conductive nature of the metal casing, it is difficult to monitor the resistivity of the formation and cement. In some cases, more than one pipe may be present, thus making it impossible to use through the casing resistivity measurements.

DESCRIPTION OF ILLUSTRATIVE EMBODIMENTS

Illustrative embodiments and related methods of the present disclosure are described below as they might be employed in a well system and method using sensors embedded in the casing string to monitor formation properties. In the interest of clarity, not all features of an actual implementation or method are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the disclosure will become apparent from consideration of the following description and drawings.

As described herein, embodiments of the present disclosure are directed to well systems and methods to accurately measure formation electrical properties behind the casing to determine water-oil contact positions and/or to assess the integrity of the cement seal over the life of the well. In a generalized embodiment, a well system includes a casing string cemented in place along a wellbore. One or more formation monitoring modules are positioned along the casing string, each having a toroid sensor positioned within a groove on an external surface of the casing string. A protective housing covers the groove, which abuts the cement layer. In an alternative embodiment, an electrode may be positioned between the cement layer and the formation.

During operation, current is provided to the casing string, and the toroid sensor measures the current flowing across the casing surface encircled by the toroid sensor and into the formation. The current can be generated by a potential difference applied between a current injection point, at a position on the casing, and the current return that could be at the surface or, in the case the current is injected into an isolated portion of the casing, between the isolated portion of the casing and either the rest of the casing or the surface. Also, the voltage drop between the conductive material (e.g., casing metal) of the casing string and the electrode behind the cement layer is also measured. This data may then be processed to determine the resistivities/resistivity contrasts of the formation and/or cement layer, whereby the cement seal quality, water-oil contact surface position, etc. may be extracted from the results.

Figure 1A:
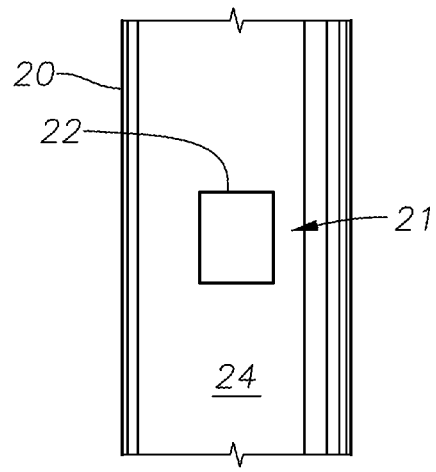
FIGS. 1A and 1B are a front and top-side view, respectively, of a casing string in accordance to certain illustrative embodiments of the present disclosure.
Figure 1B:
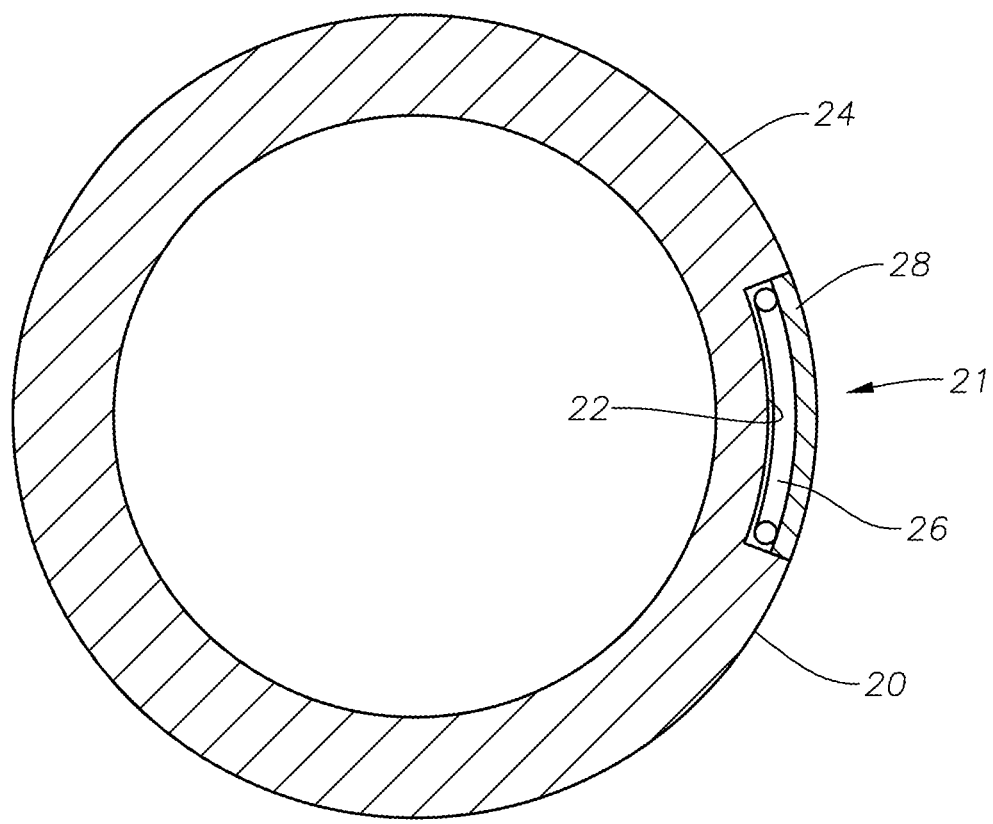

FIGS. 1A and 1B are a front and top-side view, respectively, of a casing string in accordance to certain illustrative embodiments of the present disclosure. In FIG. 1A, a section of casing string 20 includes a formation monitoring module 21. Formation monitoring module 21 includes a groove 22 on the external surface 24 of casing string 20. Groove 22 is sufficiently deep inside casing string 20 to be able to place a thin toroid 26 within it, as shown in FIG. 1B. Toroid 26 is placed within groove 22 and covered with a protective housing 28 such as, for example, an epoxy covering or other material that can withstand the stresses of downhole completion and the corrosive downhole environment. As shown in FIGS. 1A and 1B, groove 22 forms a closed path. Toroid 26 inside groove 26 also forms a closed path. As will be explained in more detail below, toroid 26 is positioned within groove 22 in order to measure the time dependent current that flows across the conductive surface of casing string 20 encircled by toroid 26. In certain illustrative embodiments, the current may be injected into casing string 20 from a surface location or in a zone close to the measurement area.

Toroid 26 may be made of a variety of materials and designs. For example, it can be fabricated with a core wire made of a material with high magnetic permeability around which a second fine copper (or other metal) wire is wrapped, thereby forming a small toroid which can be positioned inside groove 22. From Maxwell's equations, a time dependent current flow crossing the surface encircled by toroid 26 generates a time dependent magnetic field H on the path that encircles the conductive surface. Therefore, on the terminals of this fine wire, toroid 26, a time dependent voltage is generated. Accordingly, in certain illustrative methods of the present disclosure, by measuring the induced voltage at the terminals of toroid 26, the current flowing across the conductive surface can be measured.

Figure 2A:
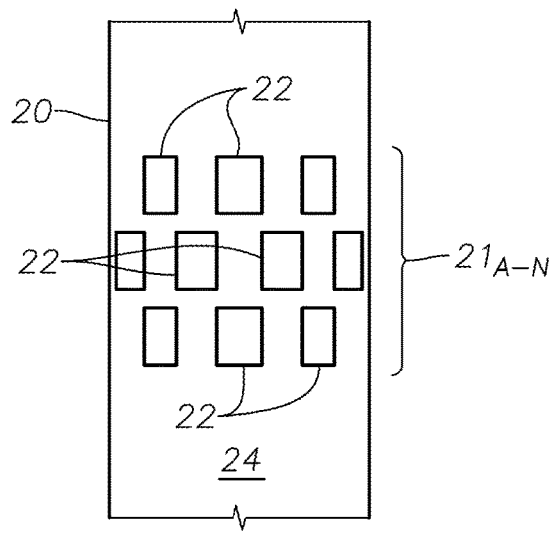
FIGS. 2A and 2B are front-side views of casing strings having multiple formation monitoring modules to increase resolution, according to certain illustrative embodiments of the present disclosure.
Figure 2B:
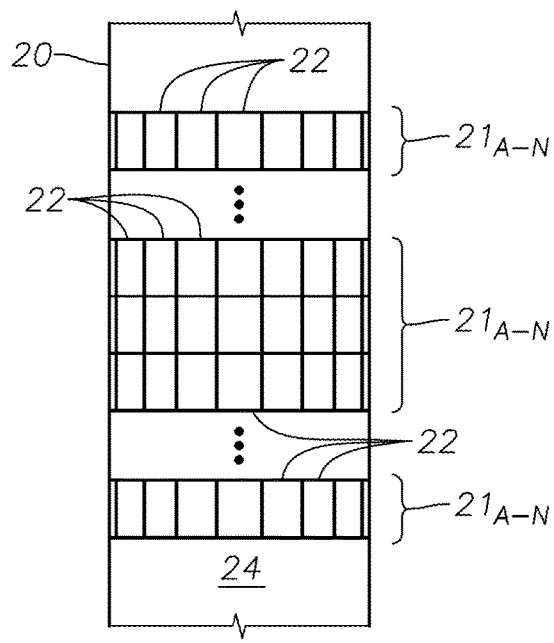

FIGS. 2A and 2B are front-side views of casing strings having multiple formation monitoring modules to increase resolution, according to certain illustrative embodiments of the present disclosure. In order to provide higher resolution of formation data, a plurality of formation monitoring modules 21 may be positioned along external surface 24 of casing string 20, as shown in FIG. 2A. To achieve this design, the size of grooves 22 may be smaller in size. Note that the square shape of grooves 22 is only illustrative in nature, as the groove may take other shapes in other embodiments. Nevertheless, on the terminals of every toroid positioned within grooves 22, a voltage is generated. In this manner, the currents flowing out of casing string 20 are measured in the methods described herein.

FIG. 2B illustrates a casing string 20 having an even higher resolution than the embodiment of FIG. 2A. In this embodiment, the entire external surface 24 of casing string 20 is covered formation monitoring modules 21. By adjusting the size of the surfaces encircled by grooves 22, the resolution of the current measurements flowing across external surface 24 of the casing pipe can be altered as desired. Although not shown in FIGS. 1A-2B, the embodiments described herein may be communicably coupled to a computer processing unit and a user interface. As such, by displaying the measurements of the current intensity versus spatial position of formation monitoring modules 21, an image can be generated. Such an image is representative of the amount of current flowing across external surface 24 of casing string 20 and into the cement layer and formation, as will be described in more detail below.

Figure 3:
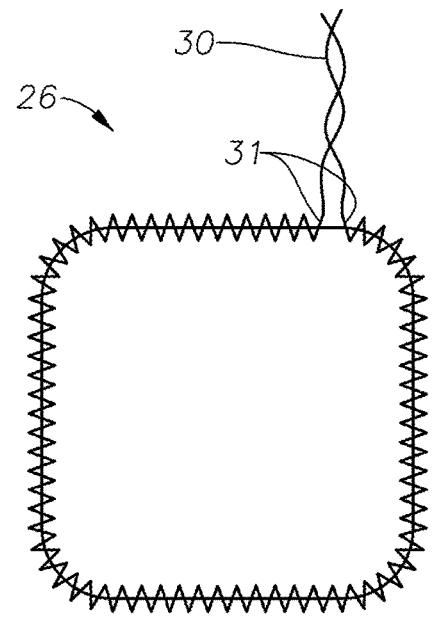
FIG. 3 illustrates a toroid which may be utilized in formation monitoring modules described herein.

FIG. 3 illustrates a toroid which may be utilized in formation monitoring modules described herein. Here, a schematic detail of the windings of toroid 26 are shown. In certain embodiments, the cable 30 that connects to terminals 31 of toroid 26 are twisted to avoid picking up unwanted signals during operation. As a result, a more accurate signal is achieved.

Figure 4A:
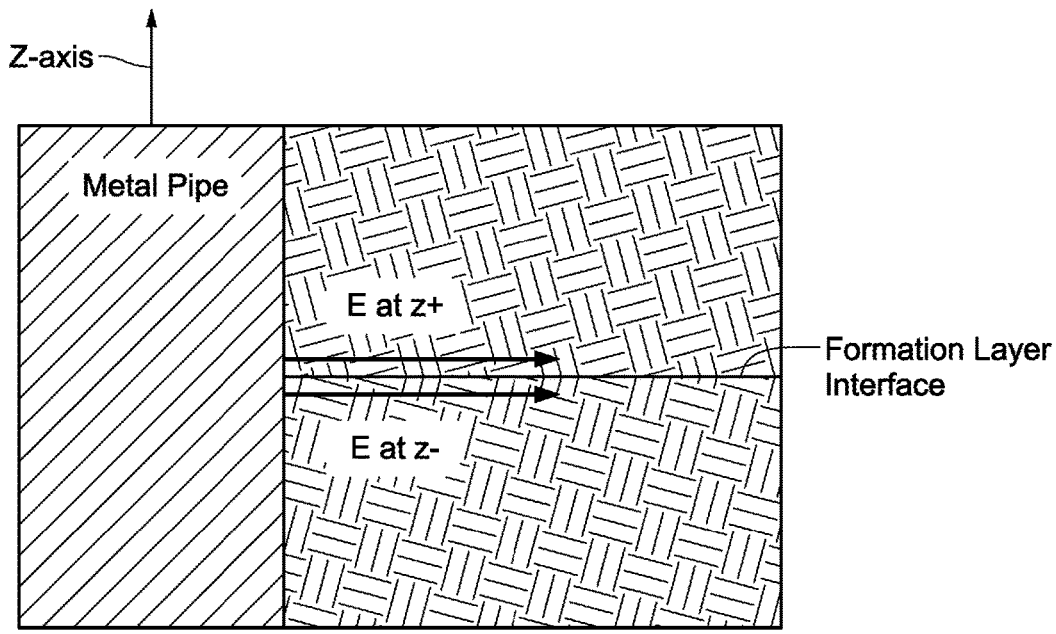
FIGS. 4A and 4B illustrate the condition of continuity of the tangential electric field which implies that the current is approximately proportional to the conductivity.
Figure 4B:
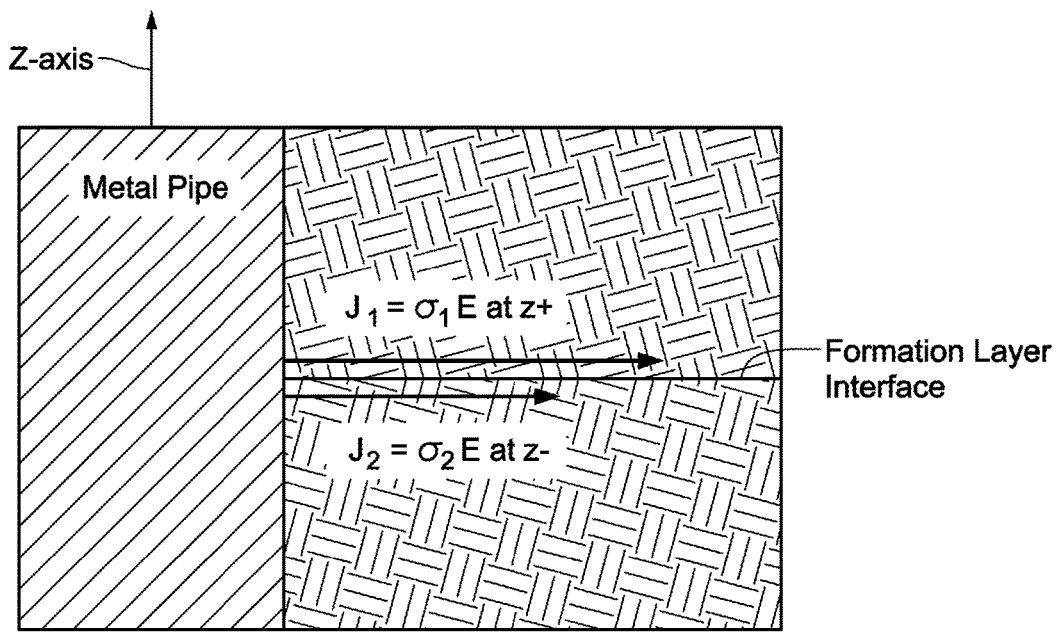

FIGS. 4A and 4B illustrate the condition of continuity of the tangential electric field which implies that the current flowing into the cement and formation on an area of the metal pipe is approximately proportional to the conductivity in front of that area. From Maxwell's equations, at the typical frequencies used to inject current from the casing (i.e., metal pipe) into the formation (low frequencies 0.01 to 10 kHz), the magnetic field is proportional to the current which is equal to the product of the conductivity by the electric field E. The condition of continuity of the tangential electric field, shown in FIGS. 4A and 4B, implies that the current is approximately proportional to the conductivity. In FIG. 4A, the continuity of the tangential field implies that the electric field E at z+ is equal to the electric field E at z− (this is understood as a limit). The conductivity across the formation layer interface, however, changes, as shown in FIG. 4B. Therefore, the current, J=σ*E is discontinuous at the interface, were σ is the conductivity of the medium, and E is the electric field on the surface of the pipe. The variation of the current is proportional to the conductivity. In this analysis, the pipe is assumed to be an approximately perfect conductor. This approximation is very good when the monitored casing section is small relative to the entire length of the casing, which is typically the case.

In FIGS. 4A and 4B, it is assumed that no rust accumulation or other surface imperfections are affecting the measurement, and that all material outside of the metal pipe is producing an effective conductivity. Here, note that the current is proportional to the conductivity in front of the metal pipe. This conductivity in a real well is composed of contributions from the formation, cement layer and any other characteristics such as corrosion, fluids present etc. Therefore, under this approximation, the current measurement is proportional to the formation conductivity. Accordingly, in certain illustrative methods of the present disclosure, in order to extract the actual conductivity, the proportionality constant is evaluated. The proportionality constant may be evaluated in a number of ways, such as, for example, using open-hole logs of the section to find a best fit numerically by using a representation of the formation from the logs and the known values of conductivity of cement, which gives an estimate for the proportionality constant.

In addition, other embodiments of the present disclosure place electrodes in the formation behind the cement layer during well construction. During operation, the voltage potential difference between the metal pipe (e.g., casing) and the inserted electrode are measured, as will be discussed in more detail below. In those embodiments in which electrodes are inserted behind the casing, the cables that connect to these electrodes should be connected to either the inside of the casing, through an appropriate connector, or to the surface by electrical wire or by other means. Such a connector may be, for example, a fiber optic channel provided the electrical signal is converted to an optical signal by means of an electro-optical transducer, for example. As will be discussed in more detail below, the signals generated by the electrodes and the toroids have to be either taken to the inside of the pipe by way of communication between the inner and outer sections of the pipe or by cables that go across the surface of the pipe or to the surface, etc.

Figure 5A:
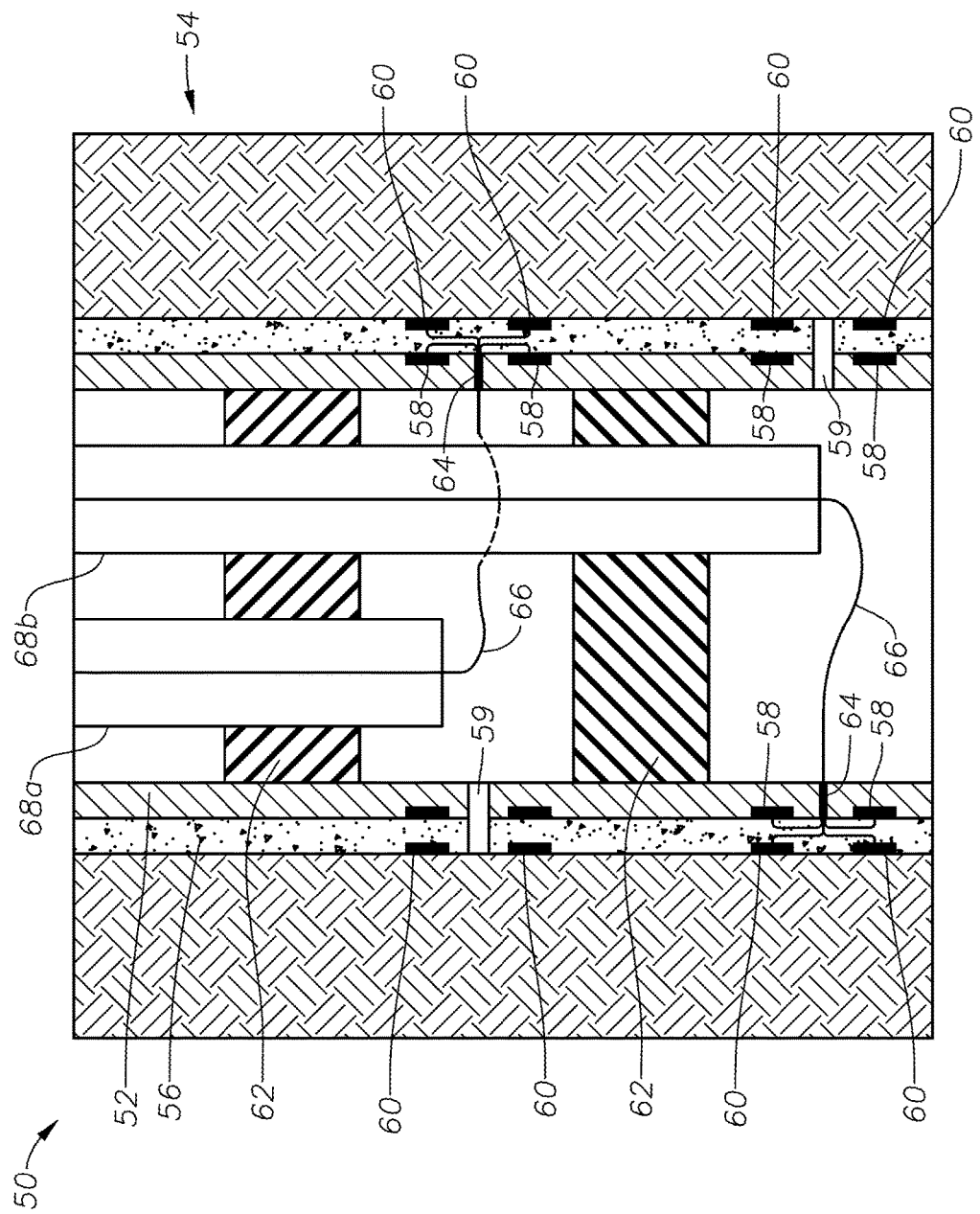
FIGS. 5A and 5B illustrate a production well system for formation monitoring through the casing, according to certain illustrative embodiments of the present disclosure.
Figure 5B:
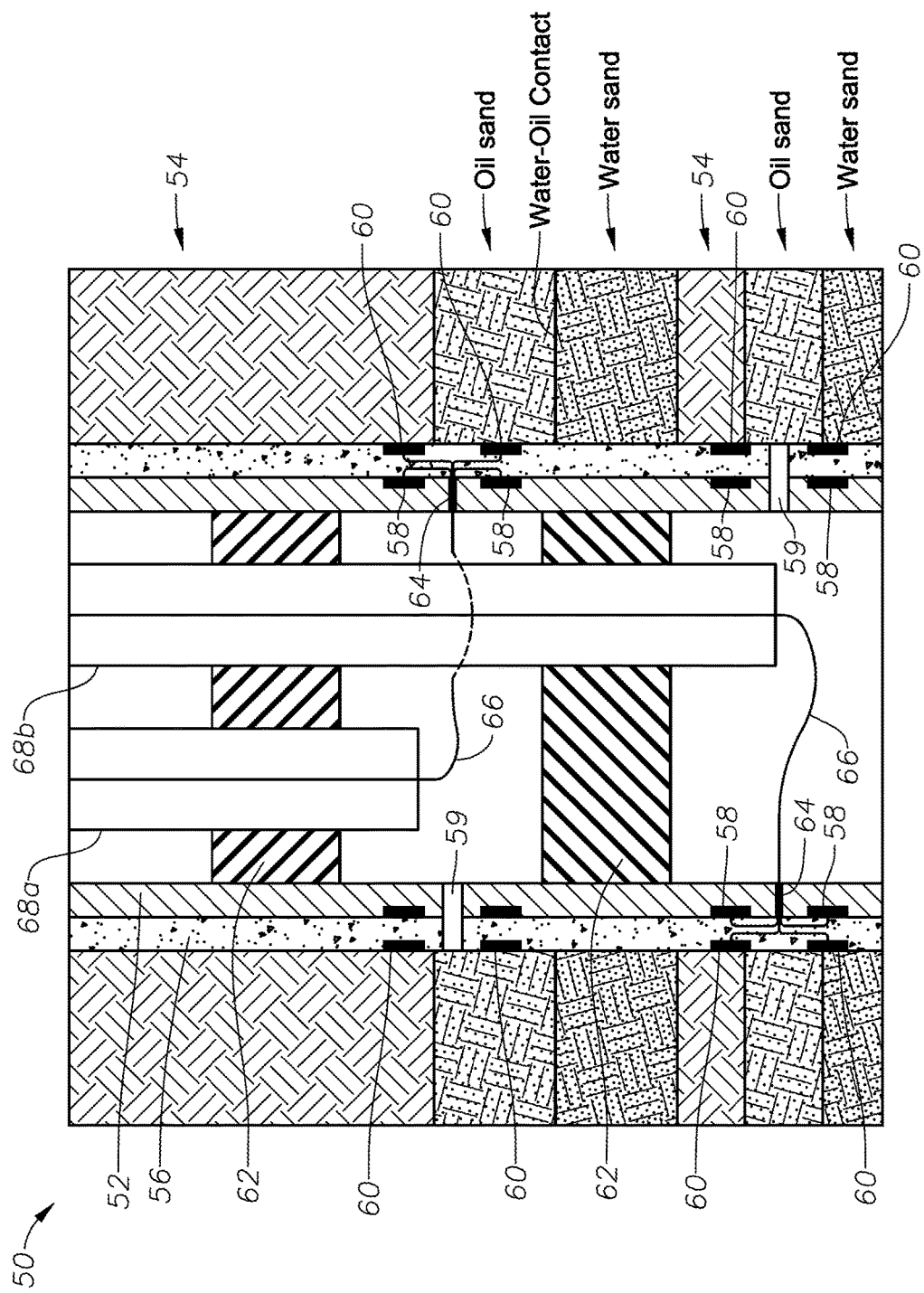

FIGS. 5A and 5B illustrate a production well system for formation monitoring through the casing, according to certain illustrative embodiments of the present disclosure. For simplicity, only a section of the casing string is illustrated. It should be noted that the well system 50 was previously drilled and cased using any known method, as would be understood by those ordinarily skilled in the art having the benefit of this disclosure. FIG. 5A indicates various components of a production well system 50 showing wire/cable connections from the sensors to the surface, while FIG. 5B indicate the oil and water sands, along with the water-oil contact surfaces.

Nevertheless, as can be seen in FIGS. 5A-5B, well system 50 includes casing string 52 extending from the surface down through a formation 54. Casing string 52 is cemented in place using cement layer 56. In the illustrated embodiment, well system 50 includes a plurality of formation monitoring modules 58 embedded along the external surface of casing string 52. A number of perforations 59 are also shown, along the two production zones illustrated, in which two production pipes 68a and 68b are extended. In addition, a plurality of electrodes 60 positioned between cement layer 56 and formation 54. Casing string 52 includes two production sections separated by packers 62. In this illustrative embodiment, formation monitoring modules 58 and electrodes 60 are disposed all around casing string 52. In FIG. 5B, the oil sands, water-oil contact surfaces and water sands are indicated along formation 54. During operation, the current measurement data/signal may be routed through connectors 64 to the inside of casing string 52, and from there to processing circuitry at the surface by wires 66 inside production pipes 68a,68b.

Still referring to FIGS. 5A-5B, in certain embodiments, the wires 66 that carry the toroid measurements to surface processing circuitry can be routed through grooves (not shown) on the external surface of casing string 52 to connectors 64. At connectors 64, wire pairs from various formation monitoring modules 58-electrode 60 pairs can be grouped together to be connected across the casing wall in order to access the measurements form the interior of casing string 52. Alternatively, the wire pairs at connectors 64 may be connected to wires outside casing string 52 in order to transmit the measurement data to the surface. In FIGS. 5A-5B, the connections are shown schematically as being connected through connectors 64 to the inside of casing string 52.

Figure 6:
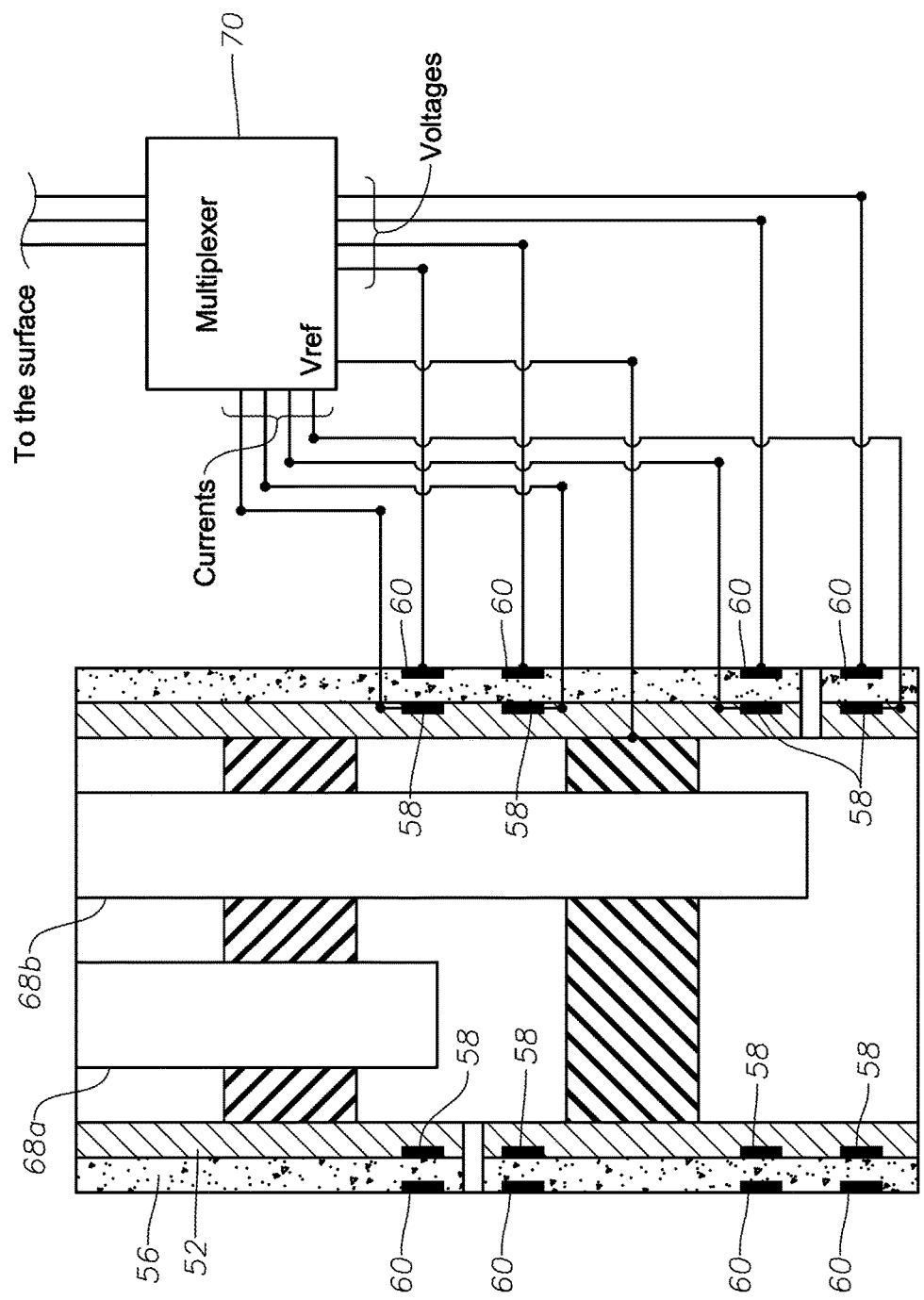
FIG. 6 illustrates a connection schematic for a well system, according to certain illustrative embodiments of the present disclosure.

FIG. 6 illustrates an alternative connection schematic, according to certain illustrative embodiments of the present disclosure. Here, no connector across the casing wall is utilized; instead, the connections to the surface are outside of casing string 52. The various measurement wires are shown to go first to a multiplexer 70, then on to the surface. In certain illustrative embodiments, the electronics required for such circuits could be energized form the surface or could be powered downhole by long lasting batteries. In other embodiments, the connection to the surface could be provided by an optic fiber channel. In such a case, the signals could be converted to optical signals which could be read/analyzed/displayed at the surface.

Figure 7:
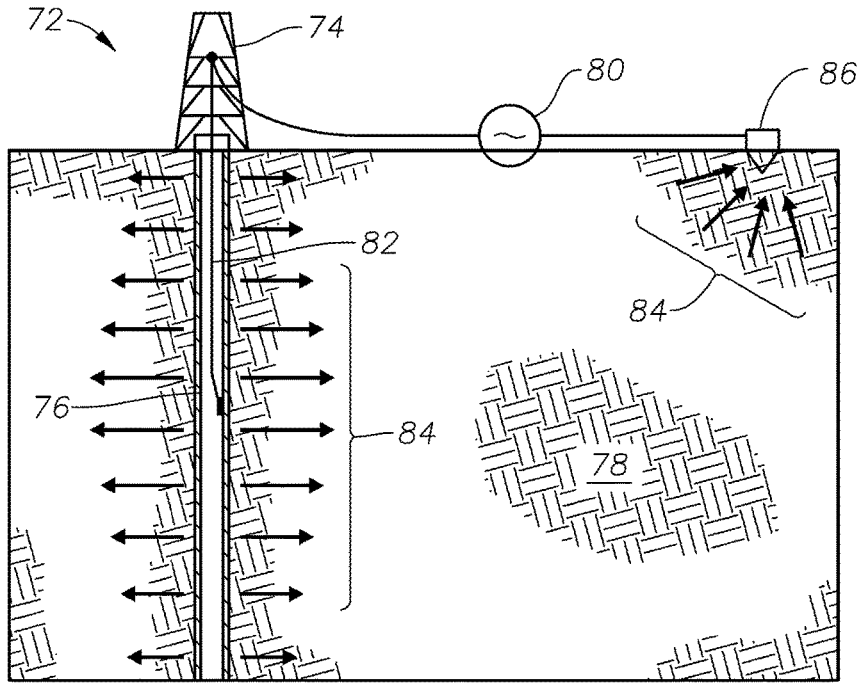
FIG. 7 illustrates the position of a current injection electrode and return electrode, according to certain illustrative embodiments of the present disclosure.

FIG. 7 illustrates the position of a current injection electrode and return electrode, according to certain illustrative embodiments of the present disclosure. Here, a well monitoring system 72 includes a derrick 74 positioned atop a cased wellbore 76 extending along a formation 78. Cased wellbore 76 may be any of the well systems described herein. During operation, a current injection electrode may be positioned in a variety of places. In certain illustrative embodiments, the current injection electrode could be an electrode in contact with the casing string adjacent the zone of the measurement (adjacent the formation monitoring module) or, alternatively, the current injection electrode may be positioned at the surface. FIG. 7 illustrates the latter, whereby a current injection electrode 80 is positioned at a surface location, and is connected to the casing string via a wire 82. In either embodiment, the current 84 flows between the current injection electrode, formation monitoring modules and/or electrodes (not shown), and on to a return electrode 86 positioned sufficiently far away to be equivalent to a return at infinity. The closer the injection point of the current is to the area of measurement, the higher the signal levels registered by the sensors (i.e., formation monitoring modules/electrodes). Also note that the amount of current close to the injection point is larger, as shown schematically in FIG. 7.

In yet another embodiment, the section of casing string in which the formation monitoring module(s) are positioned may be electrically isolated. In such embodiments, a current injection electrode will be directly coupled to the isolated section. To achieve this, the casing section can be electrically isolated by using a non-conductive material for a casing joint, such as fiberglass, or by using di-electric coatings on the connections between the casing joints. The connections with the di-electric coatings can be press, or shrunk fit, or screwed together. In this case, the current return can be the rest of the casing or an electrode at the surface. These and other alterations may be made without departing from the spirit and scope of this disclosure.

As described herein, the illustrative well monitoring systems inject current into a casing string which flows across the external surface of the string into the formation. The current flowing out of the external surface of the casing string is measured at those places where formation monitoring modules are placed, as described above. In addition, the voltage drop between the casing string and the electrodes behind the cement layer can also be measured. The resulting measurement data/signal(s) is then transmitted to computer processing circuitry (positioned at surface, downhole or at a remote location) for processing to extract additional information from about the formation and/or the cement layer. In certain embodiments, the measurement signals of each toroid are carried through wires to a multiplexer and then to the surface. In other embodiments, the measurement signals are carried on wires connected to a connector positioned across the casing pipe wall, where they are then transmitted to the surface. In yet other embodiments, a multiplexer can also be used to reduce the number of cables to the surface.

It will be recognized that computer processing unit may be connected to one or more public and/or private networks via one or more appropriate network connections. Moreover, those ordinarily skilled in the art will appreciate that the disclosure may be practiced with a variety of computer-system configurations, including hand-held devices, multi-processor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof in a computer system or other processing system.

To perform the processing of the measurement data, the computer processing unit may utilize numerical inversion in certain embodiments. Here, the inputs of the inversion will be the measurement data (applied voltage difference, currents, formation electrodes voltages or both). The outputs of the inversion can be the resistivities of both the formation and the cement layer. Moreover, the interface between water and oil in the formation can be extracted from the results.

Figure 8:
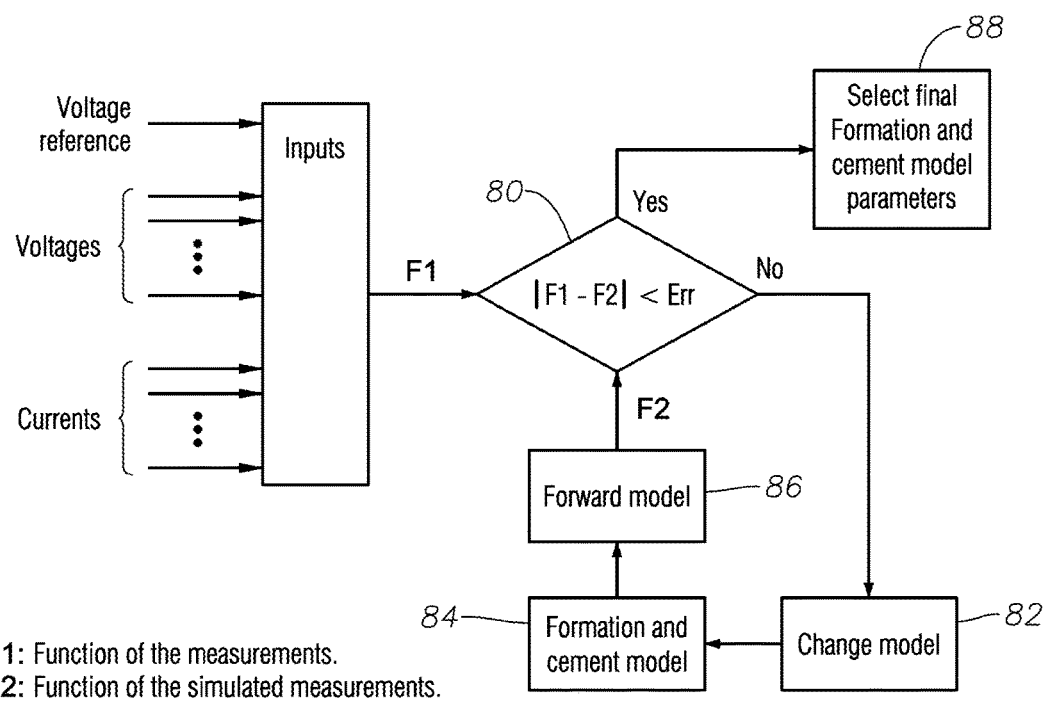
FIG. 8 is a flow chart of a mathematical inversion process utilized in certain illustrative methods of the present disclosure.

FIG. 8 is a schematic description of a mathematical inversion process used to model the formation, according to certain illustrative methods of the present disclosure. The illustrated inversion process is applied by the computer processing unit to find the best formation and cement electromagnetic parameters model that fits the measured data. In this embodiment, the model includes electrical parameters such as resistivity, dielectric permittivity, magnetic permeability of the formation and cement layer (which could be isotropic or anisotropic). In certain methods, the inputs are the currents at the formation monitoring modules. In other methods, the inputs are the voltage differences between the casing string (via formation monitoring modules) and the embedded electrodes behind the cement layer. Here, the injected currents and the voltage differences between the pipe and electrodes are measured, whereby both are used in the inversion process. In yet other methods, the inputs are the voltage difference between a point at the casing string close to the measuring area and a voltage reference that could be at the surface. In another method, the inputs are the voltage differences between the electrode and the voltage reference.

Essentially, FIG. 8 illustrates the comparison between the input measurements and the computer generated corresponding measurements from the assumed model parameters. The inversion problem is solved once the computer generated output measurements of the forward model match the input measurements close enough to satisfy the pre-specified error threshold, Err. Once input, a corresponding transform function of the measurements, F1, is output. At block 80, the processing unit compares the transform function of the simulated measurements, F2 to the input measurements, F1, to thereby determine if the differences between the two functions are less than the pre-specified error threshold, Err. If the processing unit determines the differences are outside the error threshold Err, the model is changed at block 82. Then, at block 84, the formation and cement layers are modeled again using the changed model. At block 86, a forward model is applied to solve Maxwell's Equations for the geometry, material parameters and source excitation used. Once the numerical solution of the forward model matches the measured signal within desired tolerances, it may be concluded that the properties of the formation correspond to the properties used in the numerical model.

Once the processing circuitry determines the differences between F1 and F2 are within the threshold Err, the final formation and cement model parameters are selected at block 88. The outputs may be a variety of downhole characteristics such as, for example, the formation resistivity contrasts, the water oil contact position, the resistivity of the cement. This process is continued until a formation and cement parameters model that satisfies the Err condition is found. In the case of high resolution current measurements, an additional output could be an image of the currents (which are proportional to resistivity). In other methods, the output may also include a flag to indicate fluid flow through cracks in the cement.

In yet other illustrative embodiments of the present disclosure, the system described herein can also be used to monitor the effect of production enhancement techniques that may involve the injection of fluids into the formation to increase the production of hydrocarbons. In such an embodiment, the monitoring system and the inversion can be used to determine the presence of the production enhancement injected fluids. Here, the fluid injection will be detected by the inversion process because the inverted formation will change due to the presence of injection fluid. The timely detection of fluid fronts of injected fluid can be valuable to optimize the production of the well. Furthermore, even without the use of inversion, examining the currents and voltages over time yields valuable information. Such information includes, for example, water-oil contact surface position, cement integrity fluid flows in the cement volume, and changes in such data over time.

Accordingly, the illustrative embodiments and method described herein are utilized to monitor the formation and cement layer behind the casing string by electrical means. Illustrative well systems include a casing string with formation monitoring modules embedded into its external surface. The embodiments using only the formation monitoring modules provides measurement data used to assess the formation behind the casing. In those embodiments using the formation monitoring modules and the electrodes between the cement and formation, the potential difference may be monitored to provide information necessary to assess the integrity of the cement layer. The use of numerical inversion provides additional information on the electrical properties of the volume behind casing in addition to the position of the water-oil contact surface, and the possible flow of fluids between the casing string and the formation (in the cement volume).

Even without the use of mathematical inversion, information about the position of the water-oil contact surface, the integrity of the cement and the presence of flows in the cement volume can be obtained as a function of time. The qualitative information provided by the current and voltage measurements may be sufficient in some cases to optimize well management without the use of mathematical inversion.

Moreover, the illustrative embodiments described herein may also be used to monitor the proximity of fluids injected from neighboring wells for the purpose of production enhancement whenever the fluid presents a significant resistivity contrast with respect to the pre-existing formation. This monitoring can provide crucial information to control the injection fluids to achieve optimal production.

Embodiments and methods described herein further relate to any one or more of the following paragraphs:

1. A well system for formation monitoring through casing, the well system comprising a casing string extending from a surface location into a formation, the casing string being cemented in place by a cement layer positioned between the casing string and the formation; and a formation monitoring module positioned along the casing string, the formation monitoring module comprising a groove encircling a portion of an external surface of the casing string, the external surface being in contact with the cement layer; and a toroid positioned inside the groove.

2. A well system as defined in paragraph 1, further comprising a protective housing covering the groove.

3. A well system as defined in paragraphs 1 or 2, further comprising: a current injection electrode coupled to the casing string to thereby provide current to the casing string, the current injection electrode being positioned at the surface location; and processing circuitry coupled to the toroid to receive signals from the toroid which are utilized to determine downhole characteristics.

4. A well system as defined in any of paragraphs 1-3, further comprising: a current injection electrode coupled to the casing string to thereby provide current to the casing string, the current injection electrode being positioned adjacent to the toroid; and processing circuitry coupled to the toroid to receive signals from the electrode which are utilized to determine downhole characteristics.

5. A well system as defined in any of paragraphs 1-4, wherein the formation monitoring module is positioned along a section of the casing string that is electrically isolated; and the well system further comprises a current injection electrode coupled to the section to provide current to the section.

6. A well system as defined in any of paragraphs 1-5, wherein a plurality of formation monitoring modules are positioned around the casing string.

7. A well system as defined in any of paragraphs 1-6, further comprising an electrode positioned between the cement layer and the formation.

8. A method for formation monitoring through casing, the method comprising: cementing a casing string in place along a formation using a cement layer, the casing string having a formation monitoring module comprising: a groove on an external surface of the casing string, the external surface being in contact with the cement layer; and a toroid positioned inside the groove; supplying current along the casing string; measuring the current flowing across the external surface encircled by the toroid; and determining downhole characteristics using the measured current.

9. A method as defined in paragraph 8, wherein the downhole characteristics are resistivity contrasts behind the casing string.

10. A method as defined in paragraphs 8 or 9, wherein the downhole characteristics are cement seal quality.

11. A method as defined in any of paragraphs 8-10, wherein the downhole characteristics are fluid flows in the cement layer.

12. A method as defined in any of paragraphs 8-11, wherein the downhole characteristics are water-oil contact surface position.

13. A method as defined in any of paragraphs 8-12, wherein mathematical inversion is applied to determine the downhole characteristics.

14. A method as defined in any of paragraphs 8-13, further comprising monitoring changes in the downhole characteristics over time.

15. A method as defined in any of paragraphs 8-14, wherein cementing the casing string in place further comprises positioning an electrode between the cement layer and the formation.

16. A method as defined in any of paragraphs 8-15, wherein determining downhole characteristics further comprises measuring a voltage drop between casing metal and the electrode positioned between the cement layer and the formation, wherein the voltage drop measurement is utilized to determine the downhole characteristics.

17. A method as defined in any of paragraphs 8-16, wherein: a plurality of formation monitoring modules are positioned around the casing string; and the method further comprises: measuring current flowing across the external surfaces encircled by grooves using the toroids of the formation monitoring modules; and generating an image of an intensity of the current versus a spatial position of each toroid along the casing string.

18. A method for formation monitoring through casing, the method comprising: cementing a casing string in place along a formation using a cement layer; supplying current along the casing string, whereby the current flows into the formation; measuring the current flowing into the formation using a toroid positioned along the casing string; and determining downhole characteristics using the measured current.

19. A method as defined in paragraph 18, further comprising measuring a voltage drop between the casing string and an electrode positioned between the cement layer and the formation, wherein the voltage drop is utilized to determine the downhole characteristics.

20. A method as defined in paragraphs 18 or 19, wherein the downhole characteristics are at least one of a cement seal quality, fluid flow in the cement layer, or water-oil contact surface position.

21. A method as defined in any of paragraphs 18-20, further comprising monitoring changes in the downhole characteristics over time.

Although various embodiments and methodologies have been shown and described, the disclosure is not limited to such embodiments and methodologies and will be understood to include all modifications and variations as would be apparent to one skilled in the art. Therefore, it should be understood that embodiments of the disclosure are not intended to be limited to the particular forms disclosed. Rather, the intention is to cover all modifications, equivalents and alternatives falling within the spirit and scope of the disclosure as defined by the appended claims.

What is claimed is:

1. A well system for formation monitoring through casing, the well system comprising:
   a casing string extending from a surface location into a formation, the casing string being cemented in place by a cement layer positioned between the casing string and the formation; and
   a formation monitoring module positioned along the casing string, the formation monitoring module comprising:
   a groove encircling a portion of an external surface of the casing string, the external surface being in contact with the cement layer;
   a toroid positioned inside the groove;
   a current injection electrode coupled to the casing string to thereby provide current to the casing string; and
   processing circuitry coupled to the toroid to receive signals which are utilized to determine cement seal quality.

2. A well system as defined in claim 1, further comprising a protective housing covering the groove.

3. A well system as defined in claim 1,
   wherein the current injection electrode is positioned at the surface location; and
   the processing circuitry coupled to the toroid receives signals from the toroid.

4. A well system as defined in claim 1,
   wherein the current injection electrode is positioned adjacent to the toroid; and
   the processing circuitry coupled to the toroid receives signals from the electrode.

5. A well system as defined in claim 1, wherein:
   the formation monitoring module is positioned along a section of the casing string that is electrically isolated; and
   the current injection electrode is coupled to the section to provide current to the section.

6. A well system as defined in claim 1, wherein a plurality of formation monitoring modules are positioned around the casing string.

7. A well system as defined in claim 1, further comprising an electrode positioned between the cement layer and the formation.

8. A method for formation monitoring through casing, the method comprising:
   cementing a casing string in place along a formation using a cement layer, the casing string having a formation monitoring module comprising:

a groove on an external surface of the casing string, the external surface being in contact with the cement layer; and a toroid positioned inside the groove;

supplying current along the casing string;

measuring the current flowing across the external surface encircled by the toroid; and determining cement seal quality using the measured current.

9. A method as defined in claim 8, wherein the downhole characteristics are resistivity contrasts behind the casing string.

10. A method as defined in claim 8, wherein:

a plurality of formation monitoring modules are positioned around the casing string; and the method further comprises:

measuring current flowing across the external surfaces encircled by grooves using the toroids of the formation monitoring modules; and generating an image of an intensity of the current versus a spatial position of each toroid along the casing string.

11. A method as defined in claim 8, wherein cementing the casing string in place further comprises positioning an electrode between the cement layer and the formation.

12. A method as defined in claim 11, wherein determining cement seal quality further comprises measuring a voltage drop between casing metal and the electrode positioned between the cement layer and the formation, wherein the voltage drop measurement is utilized to determine the cement seal quality.

13. A method as defined in claim 8, wherein mathematical inversion is applied to determine the downhole characteristics.

14. A method as defined in claim 8, further comprising monitoring changes in the cement seal quality over time.

15. A method for formation monitoring through casing, the method comprising:

cementing a casing string in place along a formation using a cement layer;

supplying current along the casing string, whereby the current flows into the formation;

measuring the current flowing into the formation using a toroid positioned along the casing string; and determining cement seal quality using the measured current.

16. A method as defined in claim 15, further comprising measuring a voltage drop between the casing string and an electrode positioned between the cement layer and the formation, wherein the voltage drop is utilized to determine the cement seal quality.

17. A method as defined in claim 15, further comprising monitoring changes in the cement seal quality over time.

* * * * *